No. 779,143. PATENTED JAN. 3, 1905.
W. A. VAN BRUNT.
GANG PRESS ATTACHMENT FOR GRAIN DRILLS.
APPLICATION FILED SEPT. 30, 1904.
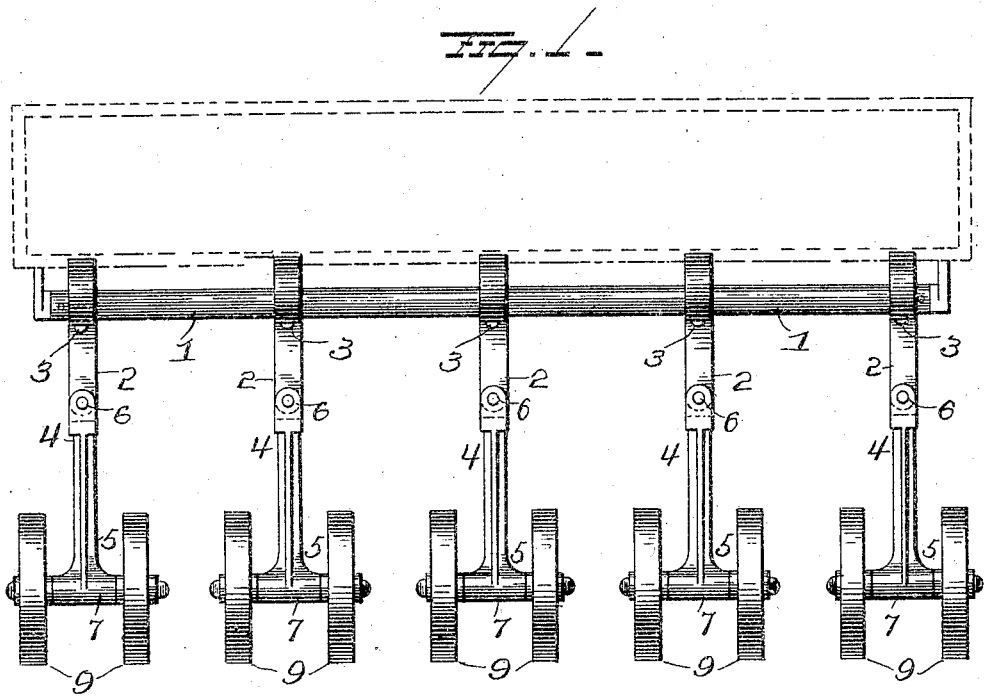
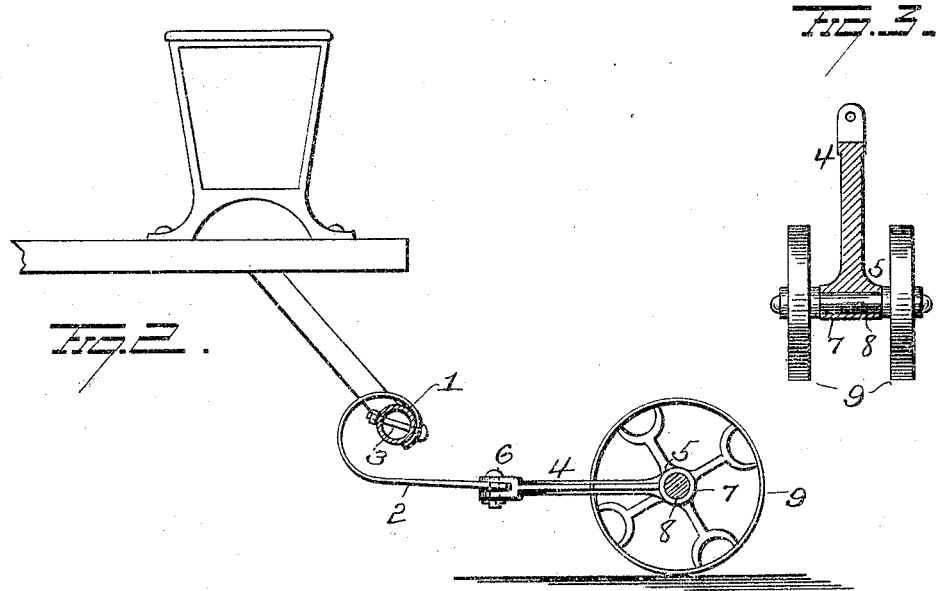

No. 779,143.   Patented January 3, 1905.

UNITED STATES PATENT OFFICE.

WILLARD A. VAN BRUNT, OF HORICON, WISCONSIN.

GANG-PRESS ATTACHMENT FOR GRAIN-DRILLS.

SPECIFICATION forming part of Letters Patent No. 779,143, dated January 3, 1905.

Application filed September 30, 1904. Serial No. 226,704.

*To all whom it may concern:*

Be it known that I, WILLARD A. VAN BRUNT, a resident of Horicon, in the county of Dodge and State of Wisconsin, have invented certain new and useful Improvements in Gang-Press Attachments for Grain-Drills; and I do hereby declare the following to be a full, clear, and exact description of the invention, such as will enable others skilled in the art to which it appertains to make and use the same.

My invention relates to improved gang-press attachments for grain-drills, the object of the invention being to provide improvements of this character in which the press-wheels are arranged in gangs with improved means for attaching the same to any forms of drill and improved construction of attachment which permits of lateral pivotal movement of each pair of press-wheels and permits one wheel to rise independent of the others and all have a uniform pressure on the ground.

With these objects in view the invention consists in certain novel features of construction and combinations and arrangements of parts, as will be more fully hereinafter described, and pointed out in the claims.

In the accompanying drawings, Figure 1 is a view in plan, illustrating my improvements. Fig. 2 is a view in side elevation, and Fig. 3 is an enlarged view of one of the pairs of press-wheels.

1 represents a horizontal tubular beam extending across the drill-frame in rear of the seedbox and to which at regular intervals springs 2 are secured. The springs 2 are bent into circular formation around beam 1 and are secured thereto by bolts 3, passed through the beam and spring and secured by nuts. The rear ends of springs 2 are located in the bifurcated forward ends of reaches 4 of brackets 5, and pivot pins or bolts 6 are passed through alined openings in the reach and spring to permit free pivotal or caster movement of the bracket. The rear end of the bracket, which is of T-form, has a sleeve 7 extending at right angles to reach 4, and a shaft or axle 8 is located in said sleeve 7, projects at both ends beyond the same, and has press-wheels 9 located thereon at both ends.

By constructing my improvements as above described each pair of press-wheels is free to move up and down independently of the others. The spring will twist sufficiently in uneven ground, so that one of a pair of wheels will move up or down independently of the other, and by pivotally connecting the reach with the spring, as above explained, each pair of wheels is free to pivot or caster and any pair can be swung out of the direct line, as may be found necessary or desirable.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus of the character described, the combination with a support, of a spring rigidly secured at one end thereto, a bracket pivotally connected with the rear end of said spring, and press-wheels carried by said bracket.

2. In an apparatus of the character described, the combination with a support, of a spring rigidly secured thereto, a bracket pivotally connected to the free end of said spring, said bracket free to swing laterally, and press-wheels at both sides of said bracket at the end thereof farthest removed from its pivotal connection with the spring.

3. In an apparatus of the character described, the combination with a beam or support, of a series of springs secured to said beam, T-shaped brackets having bifurcated ends to receive the ends of the springs, pins or bolts pivotally connecting the forward ends of the brackets to the rear ends of the springs, and press-wheels at opposite sides of said brackets at the rear end thereof.

4. In an apparatus of the character described, the combination with a grain-drill, of a tubular horizontal cross-beam in rear of the seedbox of said drill, a series of springs rigidly secured at one end to said beam, brackets pivotally attached to the rear ends of the springs, and press-wheels carried by said brackets.

In testimony whereof I have signed this specification in the presence of two subscribing witnesses.

WILLARD A. VAN BRUNT.

Witnesses:
F. H. CLAUSEN,
F. P. BIRD.